July 29, 1958  M. F. McAFEE  2,845,180
SELF-UNLOADING DRAIN PAN
Filed July 6, 1955  2 Sheets-Sheet 1

Millard F. McAfee
INVENTOR.

July 29, 1958 M. F. McAFEE 2,845,180
SELF-UNLOADING DRAIN PAN
Filed July 6, 1955 2 Sheets-Sheet 2

Millard F. McAfee
INVENTOR.

BY *Clarence A. O'Brien*
*and Harvey B. Jacobson*
Attorneys

2,845,180
SELF-UNLOADING DRAIN PAN

Millard F. McAfee, San Angelo, Tex., assignor of one-half to Omer A. Dreiling, San Angelo, Tex.

Application July 6, 1955, Serial No. 520,272

7 Claims. (Cl. 210—413)

The present invention relates to drain pan constructions and more particularly relates to a drain pan construction for draining tallow or fat from dehydrated solids consisting of animal matter in the form of meat, bone and fat.

The primary object of the present invention is in the provision of an apparatus for draining tallow or fat from dehydrated solids and then removing the dehydrated solids from the apparatus after the tallow has drained therefrom.

In the hide and meat by-products industries wherein the recovery of tallow or animal fats from dehydrated meat, bone and fat that have been processed in some manner, usually in a dry rendering cooker, an acute problem arises in the further drainage of tallow from the dehydrated solids inasmuch as while further tallow drains from the dehydrated solids, the solids tend to congeal and solidify into a hardened mass. It is the provision of an apparatus which includes a tallow receiving drain pan construction upon which the dehydrated solids may be placed for drainage along with means acting in conjunction with the pan to remove or convey the congealed and solidified solids from the pan after the drainage of the tallow therefrom in an efficient, simple manner which constitutes the present invention.

It is an important object of the invention to provide a self-unloading drain pan which automatically removes both the drained tallow therefrom and the solid material from which the tallow is drained, which pan includes an imperforate tallow receiving bottom with a perforated false bottom thereabove upon which the dehydrated solids rest.

It is a further object of the invention, ancillary to the preceding object wherein an endless chain-type conveyor is entrained over rollers at the ends of the drain pan between the false or perforated bottom and the true or imperforate bottom of the pan with one run of the conveyor overlying the false bottom and the other run of the conveyor overlying the true bottom.

It is a further object of the invention, ancillary to the preceding object, to provide an endless chain-type conveyor wherein only one run thereof is provided with scraping means whereby no interference with drainage along the imperforate bottom of the pan is encountered during draining of the tallow from the dehydrated solids.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
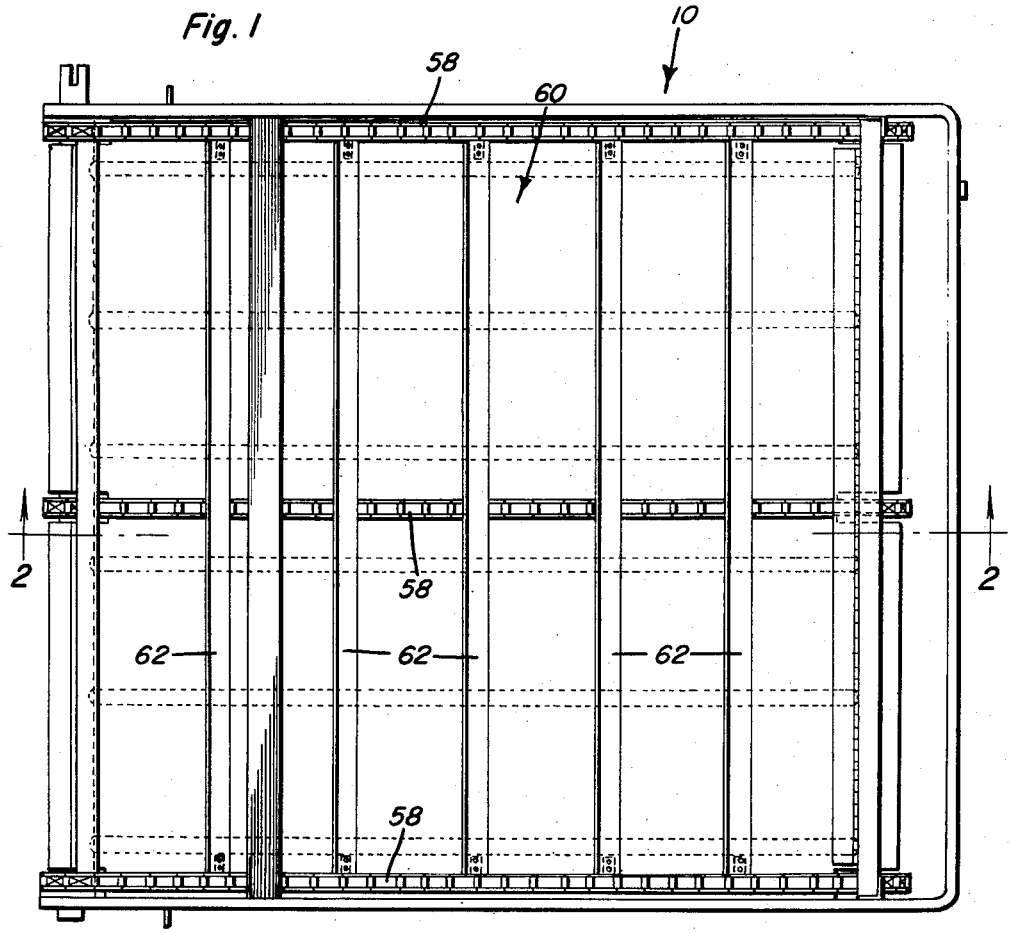
Figure 1 is a top elevational view of an apparatus constructed in accordance with the principles of the invention.
Figure 4:
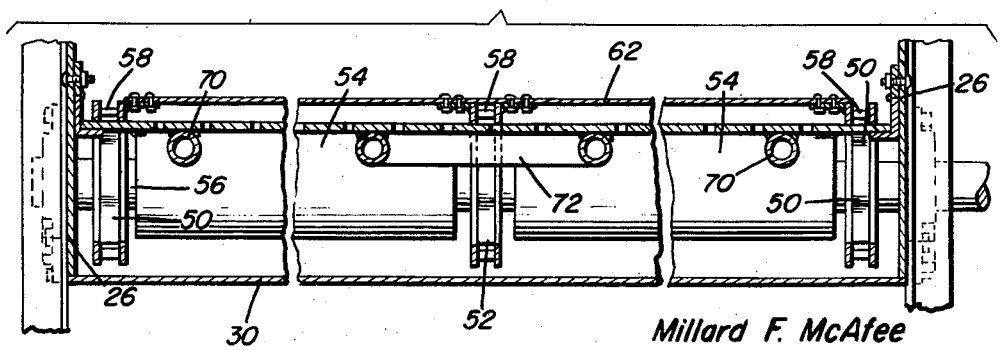
Figure 4 is a transverse cross-sectional view through the drain pan bottom and endless conveyor taken substantially along the plane of section line 4—4.

In the drawings, the apparatus constituting the present invention is designated in its entirety by the numeral 10 and is seen to consist essentially of a suitable supporting frame 12 including front and rear corner legs 16 and 18 respectively, longitudinal top rails 20 and top rear cross or end rail 22. This frame carries a self-unloading drain pan 24 which constitutes the present invention.

The drain pan 24 constituting the invention comprises side walls 26, the upper edges of which are attached rigidly to the longitudinal rails 20, a rear imperforate end wall 28 attached to the rear corner legs 18 and the top rear cross rail 22, an imperforate true bottom 30 which is inclined from the horizontal upwardly from the rear end 28 of the drain pan to the open forward or discharge end 32 of the pan.

Spaced above the imperforate bottom 30 of the drain pan 24 and disposed in parallel relation thereto is a perforated false bottom 34. Suitable brackets 36 secure the perforated false bottom 34 to the side walls 26 of the drain pan 24. As will be noted particularly from an examination of Figure 2, the rearward end 38 of the perforated false bottom 34 terminates short of the end wall 28 of the pan while the forward end 40 of the false, perforated bottom 34 terminates short of the open end 32 of the pan.

Parallel to the back wall 28 of the drain pan 24 and spaced therefrom to coincide generally with the lower end 38 of the false bottom 34 is a false back wall 42 which is perforated in the same manner as the perforated false bottom 34.

As thus far described, the operation of the frame 10 is relatively simple. The hot, dehydrated bone, meat and fat from the rendering cooker is dumped onto the pan so that it rests against the false back wall 24 and the false bottom 34. The tallow runs or flows from the hot solids onto the true bottom 30 of the pan and flows toward the rearward end of the pan and out through a tallow collecting or drainage pipe 44.

To remove the dehydrated solids from the drain pan after the tallow has been drained therefrom, the conveyor assembly designated in its entirety by the numeral 46 is provided.

The conveyor assembly 46 comprises a transversely extending shaft 48 disposed between the false bottom 34 and the true bottom 30 adjacent the lower end 38 of the false bottom 34, which shaft is suitably journaled through the side walls 26 of the drain pan. Adjacent each of the side walls 26, the shaft carries a sprocket 50 and intermediate the two end sprockets is a third sprocket 52. Further, between the center sprocket and each of the end sprockets the shaft 48 carries an enlarged roller 54 upon which the rear edge 38 of the perforated bottom 34 rests.

Adjacent the open or discharge end 32 thereof, the drain pan has extending transversely thereacross a second shaft 56 which is suitably journaled at its ends in the end walls 26 of the drain pan 24 and is disposed between the bottom 30 of the drain pan and the forward end 40 of the perforated false bottom 34 of the drain pan. Like the shaft 48 previously mentioned, the shaft 56 carries a pair of end sprockets 50 and the center sprocket 52 and enlarged rollers 54 between each end sprocket 50 and associated center sprocket 52 upon which the forward end 40 of the perforated bottom rests.

Figure 2:
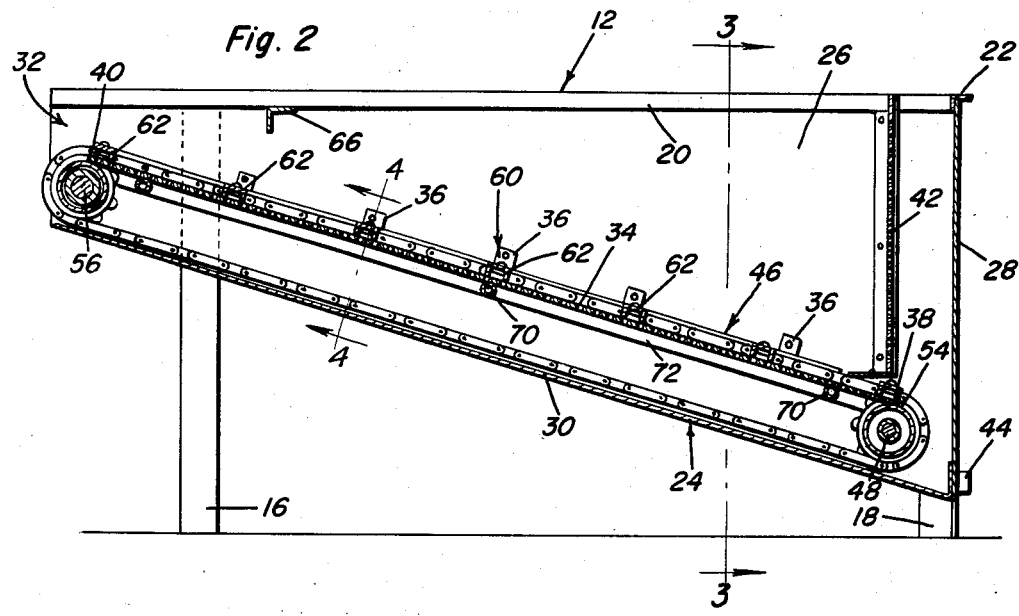
Figure 2 is a longitudinal cross sectional view taken substantially along the plane of section line 2—2 of Figure 1.
Figure 3:
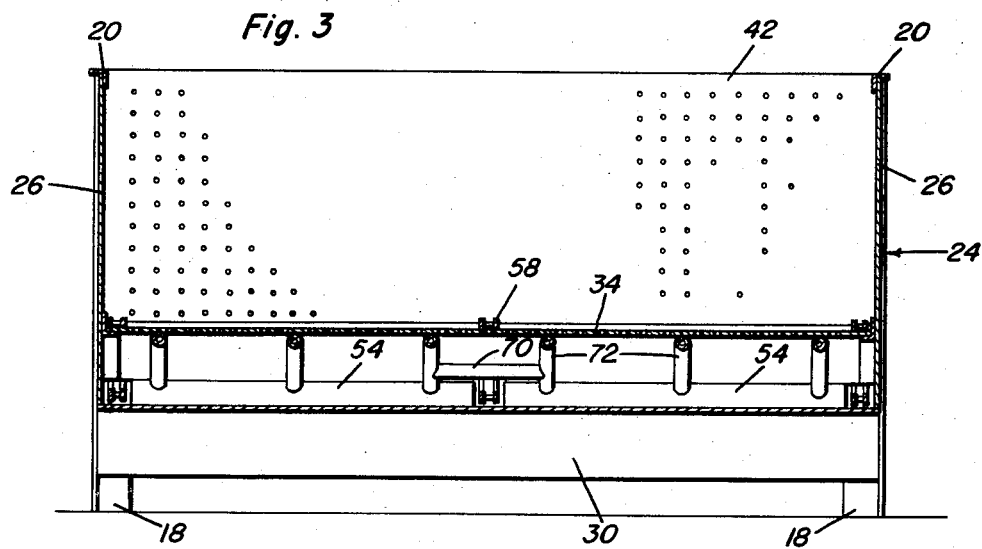
Figure 3 is a transverse cross-sectional view taken substantially along the plane of section line 3—3 of Figure 2.
Figure 5:
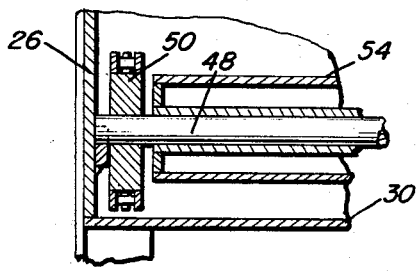
Figure 5 is a detail view of an end mounting of the conveyor with parts being shown in cross-section for clarity of detail.

Journaled over each set of end sprockets 50 and the center sprockets 52 are endless chains 58, these chains 58 forming the runs of the conveyor 46. One run of the conveyor 46 designated in its entirety by the numeral 60 as shown in Figure 2 and Figure 1 and this run only has extending transversely thereacross at longitudinally spaced intervals a plurality of breaker bars 62 which serve as combination breaker bars and scraper bars. These members are attached rigidly to the chains 58 and preferably comprise relatively heavy angle irons or channels.

One of the shafts 48 or 56 is positively driven and the other of course constitutes an idler shaft.

The operation of this portion of the device is relatively simple. After the tallow has drained from the dehydrated solids and the dehydrated solids are in a more or less congealed condition, the conveyor 46 is actuated and the dehydrated solids scraped and moved as well as being somewhat broken up through the discharge end 32 of the pan from whence they are conveyed to further processing operations.

To assure the breaking up of large lumps of the dehydrated solids as they are moved from the pan, adjacent the discharge end 32 thereof and above the upper run 60 of the conveyor 46 extending transversely across the sides and connected at its ends to the side walls 26 of the pan is a fixed angle iron breaker bar 66. This bar of course is engaged by the dehydrated solids as they move toward the discharge end 32 of the apparatus whereupon large lumps are quickly broken up before complete solidification thereof.

Also, as the run 60 travels over the bottom 30 of the drain pan 24, the channels or angle iron breaker arms 62 carried by the chains 58 engage the bottom and move the tallow toward the tallow discharge pipe 44.

To provide rigid support for the false bottom 44, supporting rods or tubes 70 extend transversely underneath the false bottom and interconnect with longitudinally extending rods or tubular braces 72, this bracing structure being attached to the end rollers 54 carried by the shafts 48 and 56, respectively.

The apparatus described serves admirably as a simple, uncomplicated machine for easily handling dehydrated animal solids in the drainage of tallow therefrom and the subsequent removal thereof from the drainage area.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An apparatus for draining tallow from dehydrated solids comprising a supporting frame, a tallow receiving pan carried by said frame, means for draining tallow from said pan, means for removing the dehydrated solids from which the tallow has drained from said pan, said pan including an imperforate tallow receiving bottom and sides, a perforated false bottom parallel to and disposed above said imperforate bottom upon which the dehydrated solids rests, supporting rods secured to said sides and forming a rest on which said false bottom is mounted, said removing means comprising an endless chain conveyor having one run overlying said false bottom and a second run overlying said imperforate bottom, one of said runs having elements thereon for breaking congealed dehydrated solids on said false bottom after tallow drainage therefrom and for moving these solids off the false bottom, said pan being longitudinally inclined from a horizontal plane and having a perforated back wall above said false bottom adjacent the lower end of said pan, said imperforate bottom extending downwardly beyond said perforated back wall for catching tallow flowing through said back wall.

2. The combination of claim 1 wherein the upper end of said pan constitutes the dehydrated solid discharge end and is open for the passage of dehydrated solids therefrom.

3. The combination of claim 2 wherein a breaker bar extends transversely across said pan above the upper run of said conveyor adjacent the discharge end thereof.

4. An apparatus for draining tallow from dehydrated solids comprising a supporting frame that has upper rails and an open top, a pair of sides secured to and depending from said upper rails, an endless conveyor mounted between said sides and including a first and a second transverse shaft, a pair of sprockets mounted on said transverse shaft, two chains engaging pairs of said sprockets wherein each pair comprises a sprocket on said first shaft and a sprocket on said second shaft, an angularly inclined bottom secured to said sides and being imperforate, said bottom sloping downwardly from said first shaft and underlying the same toward said second shaft and underlying the latter, a plurality of breaker bars secured at their ends to said chains and extending transversely across said bottom, one run of said conveyor being arranged generally parallel to said bottom with said breaker bars adapted to scrape over the upper surface of said bottom in order to propel congealed solids toward the lower end of said bottom, bars extending transversely across said sides and secured to said sides, said bars being located below the upper run of said conveyor, a perforated false bottom over which the upper run of said conveyor passes, a back wall secured to said sides and rising upwardly from the lower end of said bottom, means for withdrawing tallow from the pocket formed at the junction of said inclined bottom and said back wall, and a perforated wall arranged parallel to said back wall and secured across said sides and having its lower edge located above said second shaft.

5. The apparatus of claim 4 wherein there is a breaker bar which extends transversely across said sides and which is located above said conveyor between said first and second shafts.

6. A device for draining tallow from dehydrated solids, said device comprising a supporting frame, a tallow receiving pan carried by said frame and longitudinally inclined with respect to a horizontal plane, said pan having an imperforate tallow receiving bottom down which the tallow is adapted to move, a perforated false bottom above said imperforate tallow receiving bottom, said perforated false bottom adapted to support the dehydrated solids while they drain through the openings in said perforated false bottom enabling the tallow to fall onto said imperforate tallow receiving bottom, a conveyor operable over the upper surface of said perforated false bottom to propel the solids off of said perforated false bottom after they have drained, and a breaker bar extending across said false bottom and elevated from the surface of said false bottom in order to form an obstruction to the movement of congealed masses of solids as they are propelled from said false bottom.

7. The device of claim 6 wherein there is a wall at one end of said false bottom arranged to form an included angle with said false bottom and limit the movement of the solids when they are placed on said false bottom, said conveyor having first and second flights with one flight located above and the other flight located below said false bottom respectively so that direct access is had to the false bottom over which only one flight of said conveyor passes.

References Cited in the file of this patent

UNITED STATES PATENTS

| | | |
|---|---|---|
| 1,235,672 | Fitch et al. | Aug. 7, 1917 |
| 2,118,157 | Camp | May 24, 1938 |
| 2,650,710 | Stehling | Sept. 1, 1953 |